United States Patent
Nagarajan et al.

(10) Patent No.: US 11,954,609 B2
(45) Date of Patent: Apr. 9, 2024

(54) OPTIMIZING AND REDUCING REDUNDANT DISPATCH TICKETS VIA NETWORK KNOWLEDGE GRAPH

(71) Applicant: AT&T Intellectual Property I, L.P., Atlanta, GA (US)

(72) Inventors: Vijayan Nagarajan, Plano, TX (US); Abhay Dabholkar, Allen, TX (US); Parth Sutaria, Wylie, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 990 days.

(21) Appl. No.: 16/833,989

(22) Filed: Mar. 30, 2020

(65) Prior Publication Data
US 2021/0304044 A1    Sep. 30, 2021

(51) Int. Cl.
| | |
|---|---|
| G06Q 30/00 | (2023.01) |
| G06N 5/04 | (2023.01) |
| G06N 7/01 | (2023.01) |
| G06N 20/00 | (2019.01) |
| G06Q 10/20 | (2023.01) |

(52) U.S. Cl.
CPC ............ *G06N 5/04* (2013.01); *G06N 7/01* (2023.01); *G06N 20/00* (2019.01); *G06Q 10/20* (2013.01)

(58) Field of Classification Search
None
See application file for complete search history.

(56) References Cited

U.S. PATENT DOCUMENTS

| | | | |
|---|---|---|---|
| 2009/0025004 A1* | 1/2009 | Barnard | G06F 9/50 718/104 |
| 2017/0061512 A1* | 3/2017 | Avcil | H04W 4/023 |
| 2018/0107990 A1* | 4/2018 | Beadles | H04W 4/02 |
| 2019/0081861 A1* | 3/2019 | Kaluza | H04L 41/0895 |
| 2020/0097601 A1* | 3/2020 | Han | G06F 16/36 |
| 2020/0258057 A1* | 8/2020 | Farahat | G06Q 10/20 |
| 2022/0019495 A1* | 1/2022 | Lavi | G06F 11/0778 |

* cited by examiner

*Primary Examiner* — Matthew T Sittner
(74) *Attorney, Agent, or Firm* — Guntin & Gust, PLC; John G. Rauch

(57) ABSTRACT

Concepts and technologies disclosed herein are directed to optimizing and reducing redundant dispatch tickets via a network knowledge graph. According to one aspect disclosed herein, a network knowledge graph generation system ("NKGGS") can construct a machine learning model to determine a probability of an installation job needing a helper job to fulfill a service order. The NKGGS can execute the machine learning model to determine the probability. The machine learning model can determine the probability of the installation job needing the helper job to fulfill the service order based upon a network knowledge graph and a dependency score. The NKGGS can cluster the installation job with a plurality of installation jobs.

20 Claims, 12 Drawing Sheets

OPTIMIZING AND REDUCING REDUNDANT DISPATCH TICKETS VIA NETWORK KNOWLEDGE GRAPH

BACKGROUND

Telecommunications networks generate a multitude of datasets related to network operations, applications, users, and call processing, among many other aspects of providing telecommunications services. These datasets can provide valuable business insights, such as, for example, real-time user quality of service ("QoS"), network issues, customer satisfaction index, customer churn, network capacity forecast, and other revenue impacting insights. Traditional telecommunications application architectures and solutions utilize central network management and monitoring servers and relational database management systems ("RDBMSs") in network operations centers ("NOC"). These systems are not designed for processing large datasets to obtain deeper insights and analytics, and therefore such data intelligence is either lost or not fully utilized. Insight from this data can be utilized to improve user QoS, ensure conformance to service level agreements ("SLAs"), and launch new services and products based upon subscriber preferences, location, social preferences, and associations among subscribers.

In wireline telecommunications networks, conditions of a plant (i.e., the wires and equipment that carry customer services) change from area to area. For instance, in some areas, the network may operate at full capacity, and thus to add a new customer, new equipment must be provisioned, activated, and installed. As a result, some installation jobs require a helper job, such as an additional technician dispatched for additional work to complete the installation job. Being able to predict a helper job on installation work in the wireline network allows planners to improve the job schedule for technicians. Predicting helper jobs is made difficult by noisy, incomplete data of the plant conditions and the requirements of the installation job.

SUMMARY

Concepts and technologies disclosed herein are directed to optimizing and reducing redundant dispatch tickets via network knowledge graph. According to one aspect disclosed herein, a network knowledge graph generation system ("NKGGS") can construct a machine learning model to determine a probability of an installation job needing a helper job to fulfill a service order. The NKGGS can execute the machine learning model to determine the probability. The NKGGS can cluster the installation job with a plurality of installation jobs.

The machine learning model can determine the probability of the installation job needing the helper job to fulfill the service order based upon a network knowledge graph and a dependency score. The NKGGS can create the network knowledge graph. The NKGGS can embed the network knowledge graph into a latent space. The NKGGS can search the latent space.

The NKGGS can create the network knowledge graph by creating an entity taxonomy for a plurality of entities associated with the service order. For example, the entities can be previous customers, existing customers, bandwidth profiles, DSLAMs, ports, geographical locations, network signals, and the like. Each entity can represent a node of the network knowledge graph. In addition, NKGGS can define relationships among the plurality of entities. For example, a relationship may exist between a previous customer, an existing customer, a new customer, and a DSLAM assignment. The NKGGS can then create the network knowledge graph using the plurality of entities and the relationships. Prior to creating the entity taxonomy and the relationships, the NKGGS can receive network data from a plurality of heterogeneous sources. These sources can include, for example, an order management system, a loop facility assignment and control system, a network management system, and/or a field operations database. Other sources are contemplated.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
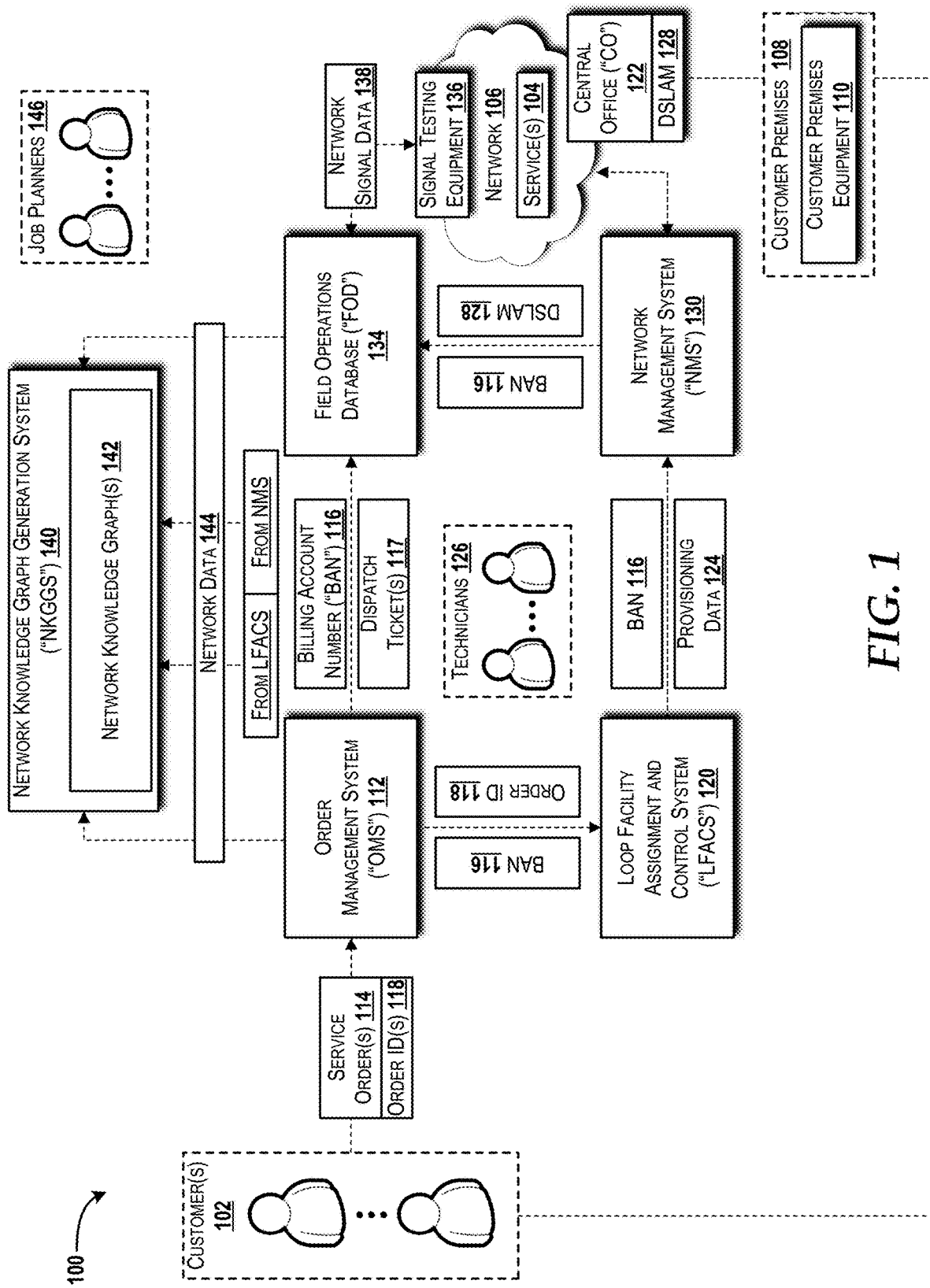
FIG. 1 is a block diagram illustrating aspects of an illustrative operating environment for various concepts and technologies disclosed herein.

In bringing data insights work from noisy data to operations, mitigating noisy data often poses challenges for data insights teams. Noisy data can negatively affect insights generation. For example, in recognizing cell phones in a collection of images, if the image data contain a number of reflections, it can be hard to detect an actual cell phone in an image. Similarly, if the image data contains static noise, it can be difficult to recognize a cell phone. Noisy data also require rejection and filter methods; noisy data require insights teams to make decisions about which data to accept and which data to reject. Filter methods can affect insights results. For example, if filter methods reject data important to the insights business objective, results will not meet requirements. In a wireline network, the plant (i.e., the wires and equipment that carry customer services) conditions change from area to area. For instance, in some places, the network is operating at 100% capacity, and to add a new customer, new equipment must be provisioned and installed before adding service for the new customer service. As a result, some install jobs require a helper job. A helper job is an additional technician dispatch for additional work to complete the install job.

The concepts and technologies disclosed herein can be used to predict when it might be necessary for a helper job on a customer install job. Being able to predict a helper job on install work in the wireline network allows planners to improve the work schedule for technicians. It also improves the install job process; knowing that a job will require a helper job to complete allows planners to schedule the helper work ahead of time. Predicting helper jobs is affected by noisy, incomplete data of the physical plant conditions and the requirements of the install work. The proposed solution uses a novel extension to a combinatoric optimization problem to find groups of jobs that are spatially clustered and likely will require helper jobs. In finding job clusters and scheduling the work before the install jobs, a method disclosed herein optimizes the per-job costs for the helper work.

The basic problem solved by the concepts and technologies disclosed herein is how to intelligently group jobs so that a single technician can complete as many jobs possible with the highest likelihood of requiring a helper job. These helper jobs can be scheduled in advance of the actual install work and allows the actual install work to occur efficiently. The concepts and technologies disclosed herein can be used to estimate the cost of scheduling the helper work when a helper is not needed, and in what proximity to consider jobs for one technician. The relative proximity of work can change between areas. The concepts and technologies disclosed herein can consider these differences and can decide how to cluster jobs. The concepts and technologies disclosed herein also can be used to estimate the benefit of the clustered jobs (i.e., how to prioritize job clusters).

Today, no systems or environments exist that consider jobs based upon a likelihood to save future work and group the jobs based on proximity and costs. The traditional ways to solve these problems is through optimization methods that explicitly use the spatial and costs objectives as constraints on the solution space, but modeling probabilistic outcomes as constraints presents many challenges. A method disclosed herein represents as extension to the current state of the art by considering the likelihood of install work needing a helper job to schedule the work.

The concepts and technologies disclosed herein provide a system that collects data related to new customer installations from numerous network systems. Secondly, the system provisions the network connection details based on region and package bandwidth. Next, the system builds a knowledge-enriched network graph (referred to herein as a "network knowledge graph") to which machine learning algorithms can be applied to infer relationships among entities (e.g., previous customers, existing customers, bandwidth profiles, DSLAMs, ports, geographical locations, network signals, and the like), perform insight extraction from the network knowledge graph, and to collect training data. The system can consider features from the network knowledge graph and can utilize advanced machine learning techniques to determine a probability that a helper job will be needed to support another job (e.g., installation, maintenance, etc.). Finally, the system can bundle predicted dispatch tickets through clustering. The system intelligently solves this decision problem as an optimization problem in terms of the costs associated with each job.

The disclosed system provides a practical means of solving an optimization problem where assignments have probabilistic outcomes with respect to the objective function. It is a practical solution because it uses aspects of the jobs to make decisions about which jobs can be clustered. This solution is also different from the state of the art for dispatching jobs. In particular, by considering a network knowledge graph and probabilistic outcomes in conjunction with proactive scheduling, the system changes the way jobs are scheduled for field technicians.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Turning now to FIG. 1, an operating environment 100 in which embodiments of the concepts and technologies disclosed herein will be described is illustrated. The illustrated operating environment 100 includes one or more customers 102 (hereinafter referred to individually as "customer 102," or collectively as "customers 102") who are interested in one or more services 104 (hereinafter referred to individually as "service 104," or collectively as "services 104") provided, at least in part, by a network 106. The customers 102 can be individuals, organizations, businesses, governments, schools, and/or the like. The service 104 will be described herein as wireline telecommunications service such as broadband Internet service. It should be understood, however, that those skilled in the art will find the concepts and technologies disclosed herein applicable to other services such as television services, other telecommunications services, natural gas services, electrical services, water services, other utility services, and the like.

The network 106 is intended to encompass the entirety of a telecommunications network, including local, regional, statewide, and/or nationwide facilities, cabling, backbone network, and other infrastructure. The concepts and technologies disclosed herein, however, are often local in nature (e.g., a neighborhood, apartment complex, office park, or individual home or business). As such, a customer premises 108 is illustrated to represent a local area associated with the customer 102. The customer premises 108 can include any customer premises equipment 110, including modems, routers, switches, and/or other network devices that allow, at least in part, the customer 102 to access the network 106. The customer premises equipment 110 can include local infrastructure, including cabling and other equipment installed at the customer premises 108. The customer premises equipment 110 also can include one or more customer devices, such as computers, tablets, smart phones, video game systems, televisions, smart devices (e.g., smart home and smart speaker devices), security systems, other Internet-capable devices, and/or the like that can connect to the network 106.

The illustrated operating environment 100 also includes an order management system ("OMS") 112. The OMS 112 can receive service orders 114 (hereinafter referred to individually as "service order 114," or collectively as "service orders 114") from the customers 102 for the services 104. The service orders 114 can be for a new service or an existing service. If a service order 114 specifies a new service, the OMS 112 can create a new account for the customer 102 that requested the new service and can assign a billing account number ("BAN") 116 to uniquely identify the customer 102 for billing and other accounting purposes. If a service order 114 specifies existing service (e.g., for maintenance and/or repair orders), the OMS 112 can reference the BAN 116 and, if applicable, any previous service order(s) 114 associated with the same or similar issue(s). The OMS 112 can create an order identifier ("order ID") 118 for each of the service orders 114. The order IDs 118 uniquely identify each service order 114 among the service orders 114 received by the OMS 112.

Aspects of the OMS 112 that are customer-facing (e.g., for the purpose of taking the service orders 114) may be implemented as an automated (e.g., artificial intelligence or pre-recorded automation) system, a partially-automated system (e.g., with human representatives as backup in case automation is insufficient to handle a customer concern), or a manual system (e.g., human representatives via a call or chat center). It is contemplated that the OMS 112 may be an Internet-based system through which the customers 102 can submit the service orders 114 via a web-based interface such as a website or portal. Telecommunications service providers may use a wide variety of software, hardware, and technologies to implement order management systems, and as such, the OMS 112 described herein is not limited to any particular software, hardware, and/or technology. Moreover, although a single OMS 112 is illustrated, some implementations may incorporate multiple OMSs 112 as needed to manage the service orders 114 from the customers 102.

The OMS 112 is also illustrated as being in communication with a loop facility assignment and control system ("LFACS") 120. The LFACS 120 inventories and assigns loops operating as part of the network 106. A "loop" refers to telecommunications facilities, such as cables, poles, terminals, electronic devices, and the like used to provide the services 104 from a central office ("CO") 122 to the customer premises 108. The CO 122 contains telecommunications switches and is an origination point of copper and fiber cables used to provide the services 104. The LFACS 120 can assign loop facilities in real-time during a service provisioning process (e.g., in response to the service order 114). The LFACS 120 can be used to maintain communication topology records associated with the service provisioning process. The LFACS 120 can utilize one or more assignment algorithms used to build communication topology records. Each communication topology record can include the physical cable routed from the CO 122 to a distribution terminal and the cable pairs that route to a particular service customer (e.g., the customer 102 at the customer premises 108). The LFACS 120 can be used to assign specific cable pairs based on the service order 114. A typical service record may include many cable pairs traversing one or more distribution terminals. For example, the LFACS 120 can use an address (e.g., physical address associated with the customer premises 108) to determine a distribution terminal associated with the address and any associated wiring limitations. Using this and other information, the LFACS 120 works back to the CO 122, mapping all the distribution terminals and related segments needed to complete the service order 114. The service order information is stored in a record and can be provided to a technician 126 as part of a job to fulfill the service order 114. The technician 126 can use the record to implement the communication path from the CO 122 to the panel box associated with the customer premises 108. A record is maintained which details the service communication path to the customer premises 108. The record is also used in subsequent service orders 114, such as for maintenance of previously-installed equipment or adding new services to an existing BAN 116. Data associated with the service provisioning process is illustrated generally as provisioning data 124 and can include the assignment of a Digital Subscriber Line Access Multiplexor ("DSLAM") 128, DSLAM port(s), and circuit details for the BAN 116. Telecommunications service providers may use a wide variety of software, hardware, and technologies to implement one or more LFACS 120, and as such, the LFACS 120 described herein is not limited to any particular software, hardware, and/or technology.

The LFACS 120 can provide the provisioning data 124 in association with the BAN 116 to a network management system ("NMS") 130. The NMS 130 can be a broadband network management system ("BBNMS") such as implemented by many telecommunications service providers. The NMS 130 can receive the provisioning data 124 from the LFACS 120. The NMS 130 can provision and activate the DSLAM 128 identified by the LFACS 120, DSLAM port(s), circuit(s), and/or other equipment (including all or a portion of the customer premises equipment 110) needed to fulfill the service order 114. The NMS 130 can provide services such as network monitoring, equipment/device detection, performance analysis, equipment management, fault management, and/or management of other aspects of the network 106. Telecommunications service providers may use a wide variety of software, hardware, and technologies to implement network management systems, and as such, the NMS 130 described herein is not limited to any particular software, hardware, and/or technology. Moreover, although a single NMS 130 is illustrated, some implementations may incorporate multiple NMSs 130 as needed to manage the network 106.

Turning back to the OMS 112, the OMS 112 also creates dispatch tickets 132 for the service orders 114. One aspect of the concepts and technologies disclosed herein is to reduce the number of dispatch tickets 132 for a given service order 114. For example, the service order 114 may specify that the customer 102 wants broadband Internet service at the customer premises 108, and so the OMS 112 can create a dispatch ticket 132 to dispatch one of the technicians 126 to the customer premises 108. Often times, after the technician 126 arrives at the customer premises 108, he/she determines that additional work is needed to fulfill the service order 114. For example, additional equipment or cabling is needed to add the customer 102 to a loop. The OMS 112 then has to create a second dispatch ticket 132 for a second technician 126 to install or otherwise ensure the additional equipment, cabling, etc. is made available. After the second technician 126 completes the work specified in the second dispatch ticket 132, the OMS 112 has to create a third dispatch ticket 132, which is essentially a duplicate of the first dispatch ticket 132. The original (first) technician 126, or another technician 126 as the case may be, then must return to the customer premises 108 to complete the work to fulfill the service order 114.

The OMS 112 is also in communication with a field operations database ("FOD") 134. The OMS 112 can send the BAN 116 and the dispatch tickets 132 to the FOD 134. The FOD 134 can record data associated with all aspects of field operations performed, at least in part, by the technicians 126. This data can be stored in association with the BANs 116 and the dispatch tickets 132.

The FOD 134 can communicate with signal testing equipment 136 deployed within the network 106. The signal testing equipment 136 can provide network signal data 138 to the FOD 134. The signal testing equipment 136 can implement AT&T's LightSpeed Broadband Tool or other broadband test tools to collect data measurements to calculate various performance metrics of the network 106. Those skilled in the art will appreciate the numerous performance metrics that can be used to assess the performance of all or a portion of the network 106, including, for example, the performance of the network 106 with respect to the service provided to the customer 102 at the customer premises 108. As such, the signal testing equipment 136 is not limited to collecting data associated with the calculation of any particular performance metric(s), although some examples may include aspects of network performance related, at least in part, to throughput, delay, loss, continuity, availability, route, and security.

Since the FOD 134 knows the BAN 116 and the DSLAM 128 data (from the NMS 130), the FOD 134 can join the appropriate network signal data 138 (from the signal testing equipment 136) to the BAN 116. With the BAN 116 in the FOD 134, whether or not a given BAN 116/service order 114 required a helper can be identified.

The illustrated operating environment 100 also includes a network knowledge graph generation system ("NKGGS") 140 used to generate network knowledge graphs 142 (hereinafter referred to individually as "network knowledge graph 142," or collectively as "network knowledge graphs 142") that integrate network data 144 collected from various heterogeneous sources, such as the OMS 112, the LFACS 120, the NMS 130, the FOD 134, and the supply chain (not shown), and provide a human-interpretable (e.g., by one or more job planners 146) representation as well as a formalized, machine-readable basis for information retrieval tasks. The network knowledge graph 142 is a knowledge base built upon "entities" on network data. These entities and the relationships among them form the ontology of the network data and are used by telecom to enhance its recommender systems and analytics. When building the network knowledge graph 142, the NKGGS 140 can apply machine learning techniques, which is essentially a process of data standardization on customer-generated content and external data sources, in which machine learning is applied to entity taxonomy construction, entity relationship inference, data representation for downstream data customers, insight extraction from graph, and interactive data acquisition from users to validate inference(s) and collect training data. The network knowledge graph 142 can be a dynamic graph. New entities can be added to the graph and new relationships can be formed continuously. Existing relationships can also change. The network knowledge graph 142 can be updated in real time based upon network profile changes and when new entities emerge.

The network knowledge graph 142 overcomes misinterpretation and structural issues by linking together all the network data 144. The network knowledge graph 142 is a large knowledge base built upon entities such as previous customers, existing customers, bandwidth profiles, DSLAMs, ports, geographical locations, network signals, and the like. These entities and the relationships among them form the ontology of the network 106 (or portions thereof) and are used to enhance business and consumer analytics. An example network knowledge graph 142 will now be described with reference to FIG. 2.

Figure 2:
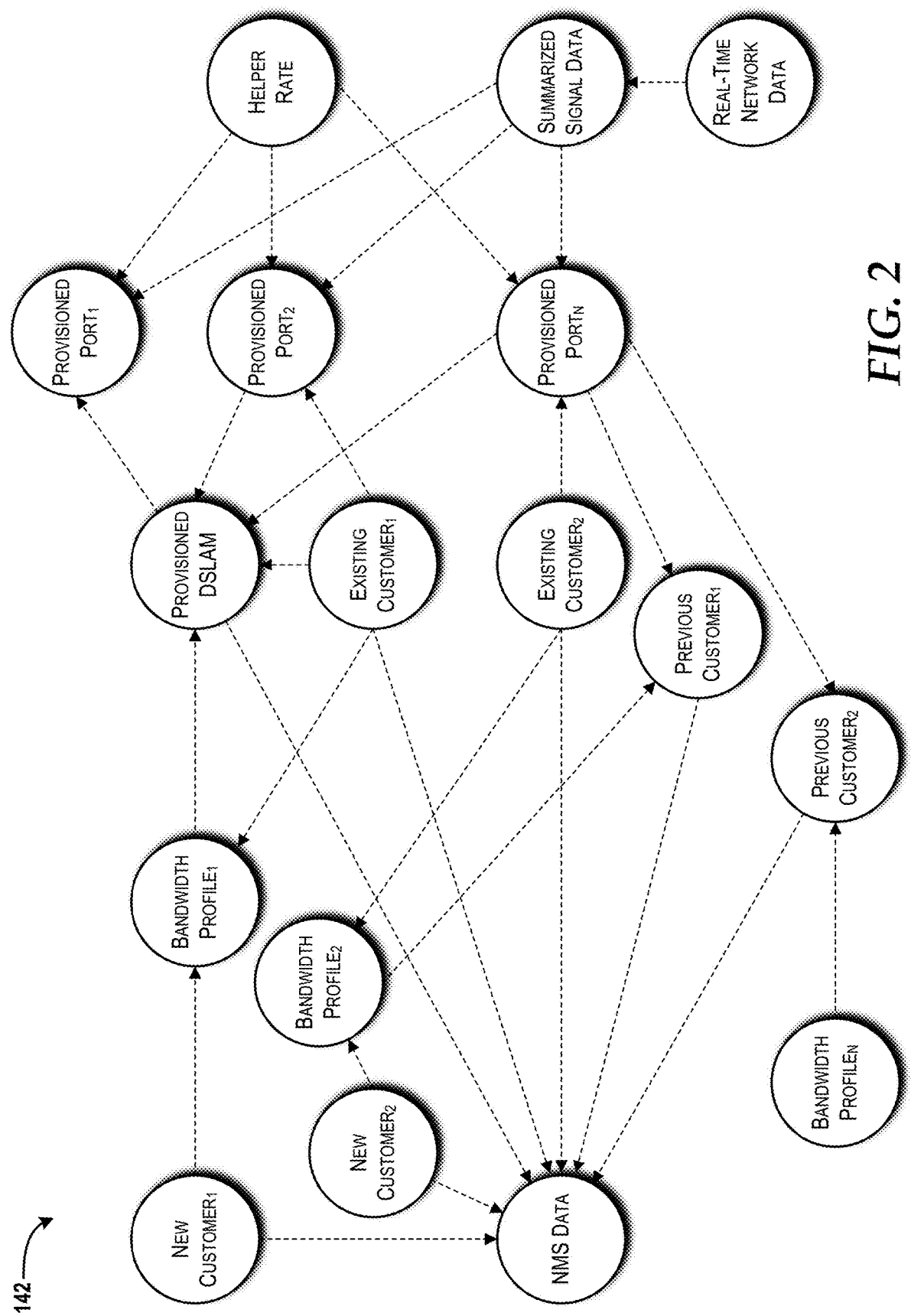
FIG. 2 is a diagram illustrating aspects of a network knowledge graph, according to an illustrative embodiment of the concepts and technologies disclosed herein.

FIG. 2 illustrates aspects of an example network knowledge graph 142, according to an illustrative embodiment of the concepts and technologies disclosed herein. The network knowledge graph 142 includes a plurality of nodes (shown as circles). Each node is representative of an entity. Each node is shown as being related to one or more other nodes. These relationships are illustrated as dashed lines.

The example network knowledge graph 142 includes entities such as new customers, NMS data, bandwidth profiles, previous customers, existing customers, provisioned DSLAM, provisioned port, helper rate, summarized signal data, and real-time network data. The example network knowledge graph 142 shows two new customers ("New Customer$_1$" and "New Customer$_2$") each assigned a bandwidth profile ("Bandwidth Profile$_1$" and "Bandwidth Profile$_2$," respectively). A DSLAM has been provisioned ("Provisioned DSLAM") for both new customers. Provisioned DSLAM also serves two existing customers ("Existing Customer$_1$" and "Existing Customer$_2$") and has served two previous customers ("Previous Customer$_1$" and "Previous Customer$_2$"). Existing Customer$_1$ has the same bandwidth profile as New Customer$_1$ (i.e., Bandwidth Profile$_1$ such as 100 mbps). Existing Customer$_2$ has the same bandwidth profile as New Customer$_2$ (i.e., Bandwidth Profile$_2$ such as 50 mbps). Previous Customer$_1$ also shares Bandwidth Profile$_2$. Previous Customer$_2$ was assigned Bandwidth Profiler$_3$ (such as X mbps).

Provisioned DSLAM has N provisioned ports ("Provisioned Port$_1$," "Provisioned Port$_2$," and "Provisioned Port$_N$"). New Customer$_1$ has been assigned to Provisioned Port$_1$. Existing Customer$_1$ was assigned to Provisioned Port$_1$. Existing Customer$_2$ was assigned to Provisioned Port$_N$. Both Previous Customer$_1$ and Previous Customer$_2$ were assigned to Provisioned Port$_N$. It should be noted that Provisioned Port$_N$ may be representative of multiple ports, and therefore customers shown in relation to Provisioned Port$_N$ may have been provisioned on the same or different port. Provisioned Port$_N$ is shown to simplify the illustrated example.

The network knowledge graph 142 also shows a "Helper Rate" entity that is representative of the number of helper jobs needed on the related ports and DSLAM. A "Summarized Signal Data" entity is representative of the network signal data 138 summarized over a period of time for the related ports and DSLAM. Current network signal data 138 is represented in a "Real-Time Network Data" entity. All customer entities are shown as being related to an NMS data entity that stores customer demographic and customer premises 108 buildout information.

The NKGGS 140 can generate the network knowledge graph 142 for any number of entities. The NKGGS 140 can be configured to present all or a portion of the network knowledge graph 142 to the job planners 146 (see FIG. 1).

It is contemplated that the job planners 146 can navigate the network knowledge graph 142 via a computerized user interface such that the job planners 146 can isolate portions of the network knowledge graph 142 associated with particular BANs 116, service orders 114, and/or dispatch tickets 132. The visual representation of the network knowledge graph 142 may be determined based upon the needs of a given service provider and may be a simplistic graph as depicted in the example shown in FIG. 2, or may be more complex with additional information presented, for example, upon hovering over (via a mouse icon), touching (via a touchscreen), selecting, or otherwise interacting with or selecting an entity. For example, selecting the "New Customer$_1$" entity may reveal additional information about that customer, such as stored in association with the BAN 116 for that customer. Likewise, the "Bandwidth Profile$_1$" entity, upon selection, may reveal details of the bandwidth allocated to any related customer(s). The type and amount of information disclosed to the job planners 146 may be at the discretion of the service provider, since more information may not always be needed or wanted in some implementations.

Figure 3:
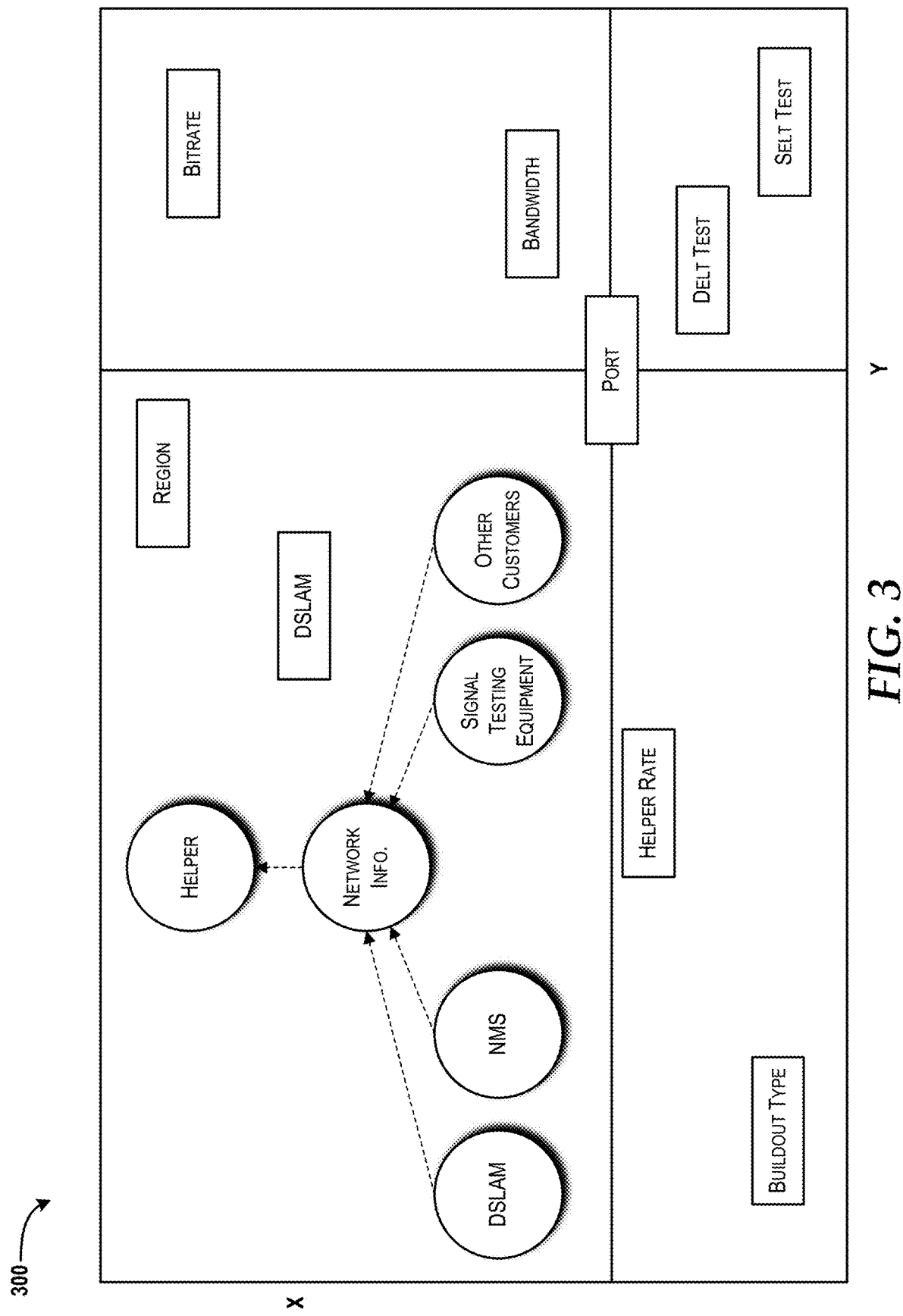
FIG. 3 is a diagram illustrating aspects of a high dimensional latent space embedded with a network knowledge graph, according to an illustrative embodiment of the concepts and technologies disclosed herein.

Turning now to FIG. 3, a diagram illustrating aspects of a latent space 300 embedded with a network knowledge graph 142 will be described, according to an illustrative embodiment of the concepts and technologies disclosed herein. The latent space 300 provides a representation of compressed data in which similar data points are closer together in space. In general, latent space is useful for learning data features and for finding simpler representations of data for analysis.

The illustrated latent space 300 encompasses the semantics in multiple entity relationships. After embedding all data into the same high-dimensional latent space using deep learning techniques, the illustrated example visualizes features in close proximity to the "Helper" entity after dimensionality reduction. For instance, the model has a single objective, which is to predict whether a helper is needed or not based on simple arithmetic operations on the features latent vector. By optimizing the model for core objectives (e.g., instead of helper, change the objective to port failure, DSLAM failure, red light or other error indicator on routing device, etc.), various kinds of features can be extracted to feed relevance models. Using similar features in the latent space 300, the objective can be modified such as to provide the probability of port failure, the probability of DSLAM failure, etc.

Figure 4:
FIG. 4 is a map illustrating a geographical area that depicts a number of actual install jobs that required a helper.

Turning now to FIG. 4, a map illustrating a geographical area that depicts a number of actual install jobs that required a helper (shown generally as 400) will be described. After installation jobs are completed, the NKGGS 140 can measure its performance based on actual job data. The NKGGS 140 can update the job data for this geographical area based on performance feedback. This is part of the knowledge graph building process. After creating a machine learning model, the NKGGS 140 can compare results of the machine learning model and actual performance and update the knowledge graph accordingly.

Figure 5:
FIG. 5 is a map illustrating the geographical area shown in FIG. 4 with a number of predicted install jobs that required a helper.

Turning now to FIG. 5, a map illustrating the geographical area shown in FIG. 4 with a number of predicted install jobs that required a helper (shown generally as 500) will be described. The NKGGS 140 can execute the machine learning model based on the variables and information know for install jobs, such as the current jobs in queue (e.g., one week outlook) and the maintenance data for the equipment need for those jobs, to estimate the probability of the jobs needing a helper.

Figure 6:
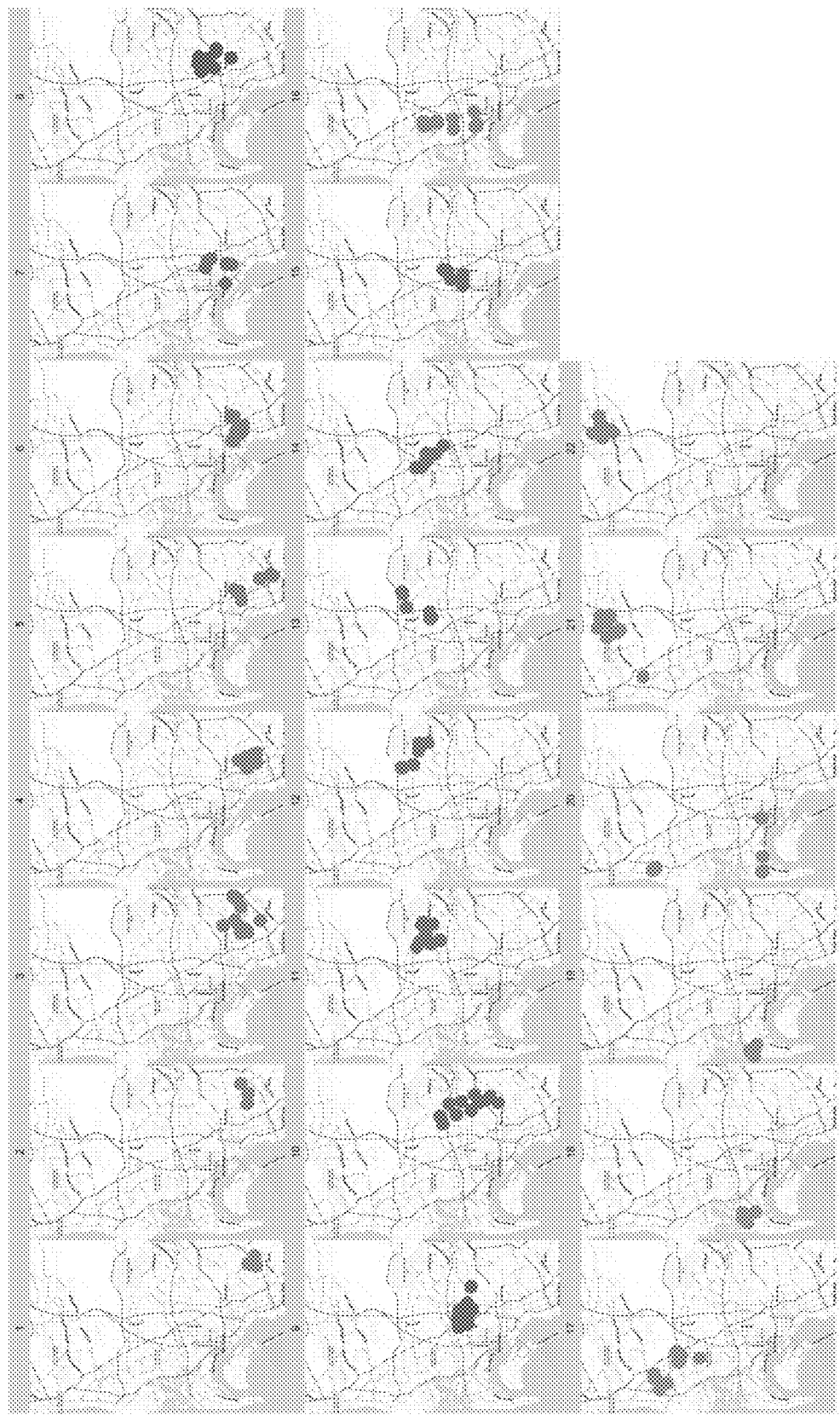
FIG. 6 is a map illustrating the geographical area shown in FIGS. 4 and 5 with different cluster sizes.

Turning now to FIG. 6, a map illustrating the geographical area shown in FIGS. 4 and 5 with different cluster sizes (shown generally as 600) will be described. After the NKGGS 140 determines the helper predictions, a clustering algorithm can be used to create the illustrated map based on the following binomial probability formula in which n is the number of trials, k is the number of successes, n-k is the number of failures, p is the probability of success in one trial, and q is the probability of failure in one trial (q=1-p).

$$P(k \text{ successes in } n \text{ trials}) = \binom{n}{k} p^k q^{n-k}$$

Using this formula, the minimum cluster size with 90% probability that at least one ticket is a helper can be $$P(1 \text{ successes in } n \text{ trials}) = 0.90 = \binom{n}{k} p^k q^{n-k},$$

where k=1, p=0.4 (precision), and q=p−1=0.6. Solving for n, the number of trials is 12*.

Figure 7:
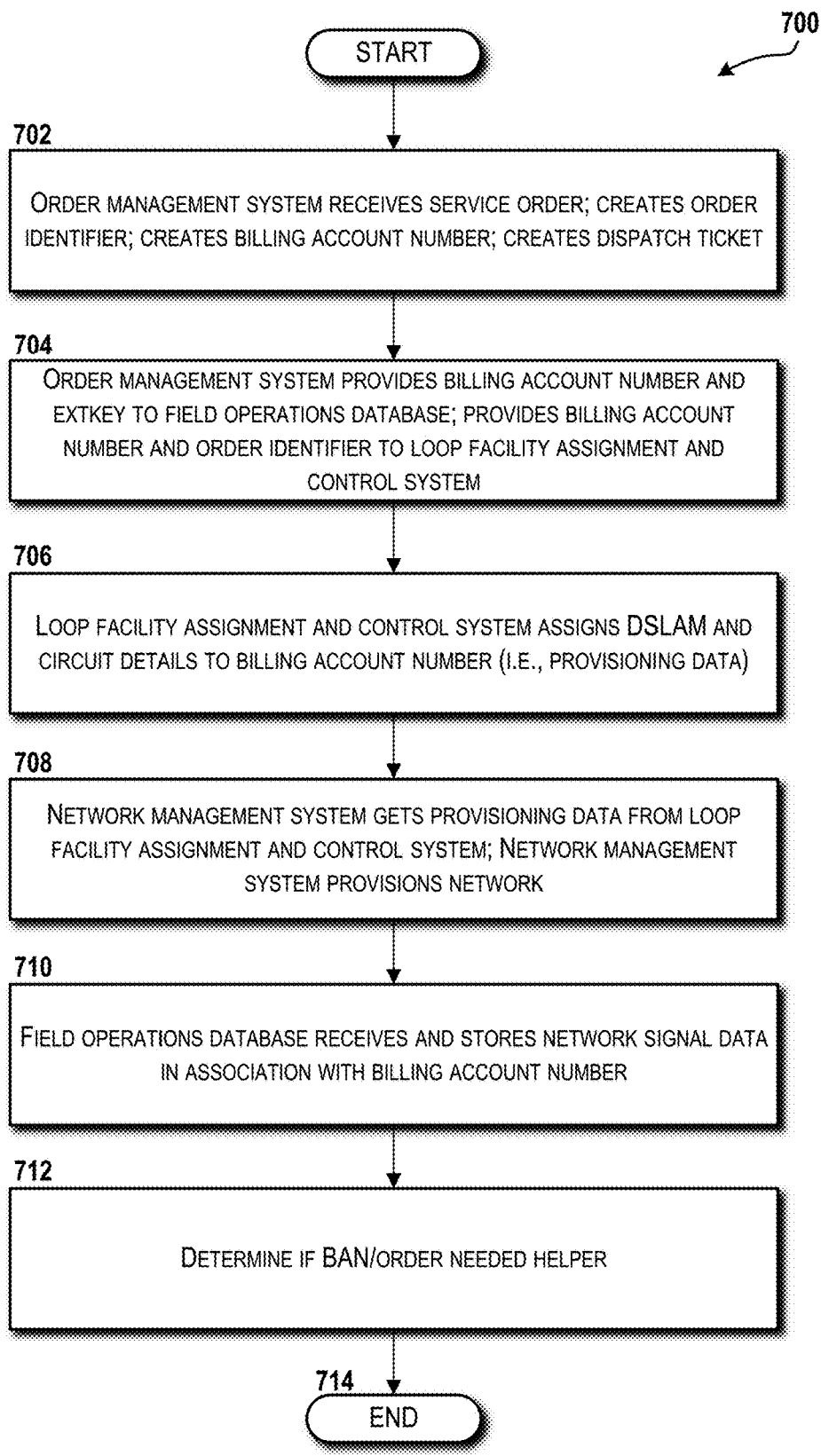
FIG. 7 is a flow diagram illustrating aspects of a method for network profile provisioning, according to an illustrative embodiment of the concepts and technologies disclosed herein.

Turning now to FIG. 7, a flow diagram illustrating aspects of a method 700 for network profile provisioning will be described, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multi-processor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the methods disclosed herein are described as being performed by alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 700 will be described with reference to FIG. 7 and further reference to FIG. 1. The method 700 begins and proceeds to operation 702. At operation 702, the OMS 112 receives a service order 114 and creates an order ID 118 to uniquely identify the service order 114. If the service order 114 is for a new customer account, the OMS 112 can create a new BAN 116 that uniquely identifies the customer account. The OMS 112 also can create a dispatch ticket 132 for the service order 114. From operation 702, the method 700 proceeds to operation 704. At operation 704, the OMS 112 provides the BAN 116 and the dispatch ticket 132 to the FOD 134. The OMS 112 can provide the BAN 116 and the order ID 118 to the LFACS 120.

From operation 704, the method 700 proceeds to operation 706. At operation 706, the LFACS 120 assigns a DSLAM 128 and circuit details to the BAN 116. This is shown as "provisioning data 124" in FIG. 1. From operation 706, the method 700 proceeds to operation 708. At operation 708, the NMS 130 gets the provisioning data 124 from the LFACS 120. The NMS 130 can utilize the provisioning data 124 to provision the network to accommodate the service order 114. From operation 708, the method 700 proceeds to operation 710. At operation 710, the FOD 134 receives the network signal data 138 from the signal testing equipment 136 and stores the network signal data 138 in association with the BAN 116. From operation 710, the method 700 proceeds to operation 712. At operation 712, with the BAN 116 in the FOD 134, it can be determined whether or not a given BAN 116 required a helper to fulfill the service order 114.

From operation 712, the method 700 proceeds to operation 714. At operation 714, the method 700 can end.

Figure 8:
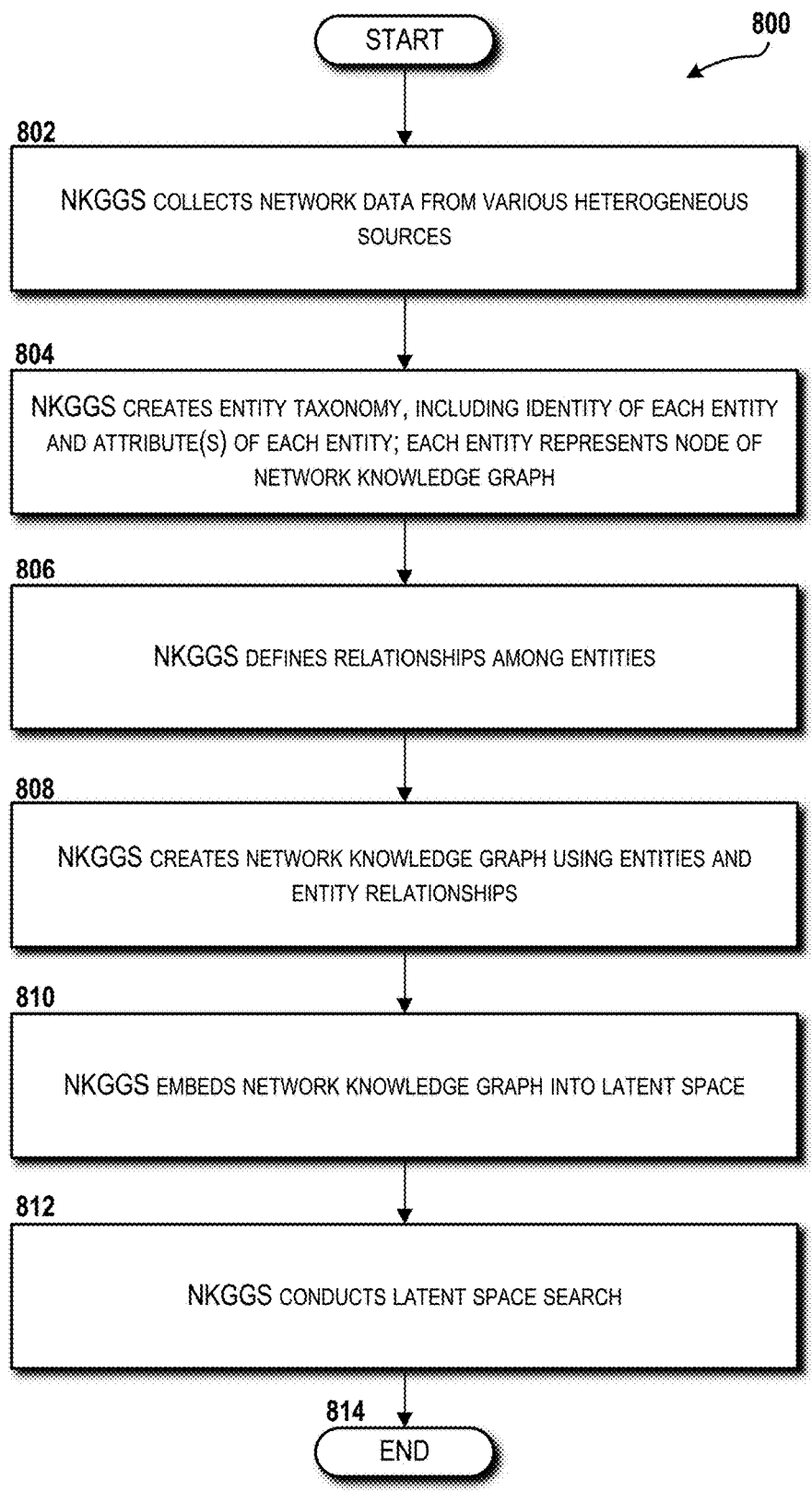
FIG. 8 is a flow diagram illustrating aspects of a method for generating a network knowledge graph, according to an illustrative embodiment of the concepts and technologies disclosed herein.

Turning now to FIG. 8, a flow diagram illustrating aspects of a method 800 for generating a network knowledge graph 142 will be described, according to an illustrative embodiment of the concepts and technologies disclosed herein. The method 800 begins and proceeds to operation 802. At operation 802, the NKGGS 140 collects the network data 144 from various heterogeneous sources, such as the OMS 112, the LFACS 120, the NMS 130, and the FOD 134.

From operation 802, the method 800 proceeds to operation 804. At operation 804, the NKGGS 140 creates an entity taxonomy. Entities represent the nodes in the network knowledge graph 142. Rules can be generated inductively to identify inaccurate or problematic organic entities. Entity attributes can have confidence scores, either computed by a machine learning model, or assigned to be 1.0 if attributes are manually verified. The confidence scores predicted by machines can be calibrated using a separate validation set, such that downstream applications can balance the tradeoff between accuracy and coverage easily by interpreting it as probability. The entity taxonomy includes an identity of each entity and one or more attributes of each entity. Each entity represents a node of the network knowledge graph 142. From operation 804, the method 800 proceeds to operation 806. At operation 806, the NKGGS 140 defines relationships among the entities. There are many valuable relationships between entities in the network ecosystem; and similarity between entities are important features in relevance models. It is a near real-time content processing framework to infer entity relationships. The NKGGS 140 can train a binary classifier for each kind of entity relationship: a pair of entities belong to a given entity relationship in a binary manner (e.g., belong or not) on the basis of a set of features. Collecting high-quality training data for this supervised task is challenging. Manually created relationships can be used as the positive training examples. By randomly adding noise as the negative training examples, per-entity prediction models can be trained. This method works well for popular entities. A joint model can be derived that covers entities in the long-tail of the distribution and to alleviate manually selection errors. Entity taxonomies and entity relationships collectively make up the standardized version of network data in a graph structure. From operation 806, the method 800 proceeds to operation 808. At operation 808, the NKGGS 140 creates the network knowledge graph 142 using the entities and the entity relationships.

From operation 808, the method 800 proceeds to operation 810. At operation 810, the NKGGS 140 embeds the network knowledge graph 142 into a latent space 300. As a result, the latent vector of an entity encompasses its semantics in multiple entity taxonomies and multiple entity relationships (classifiers) compactly. After embedding all customers and network profile into the same high-dimensional latent space using deep learning techniques, the graph visualizes network info such as "helper rate," "buildout type," and "port" in close proximity to the "helper" after dimensionality reduction. As can be seen in FIG. 3, the semantic proximities between entities in the original knowledge graph are still retained after the embedding. In this example, the model has a single objective, which is to predict a helper latent vector based on simple arithmetic operations on the network info latent vectors. It is particularly useful to infer the entity relationship from network profile to helper. By optimizing the model for multiple objectives simultaneously, latent representations can be learned more generically. Representing heterogeneous entities as vectors in the same latent space provides a concise way for using the knowledge graph as a data source from which we can extract various kinds of features to feed relevance models. This is particularly useful to relevance models, as it significantly reduce the feature engineering work on the network knowledge graph 142. From operation 810, the method 800 proceeds to operation 812. At operation 812, the NKGGS 140 conducts a search on the latent space 300.

From operation 812, the method 800 proceeds to operation 814. The method 800 can end at operation 814.

Figure 9:
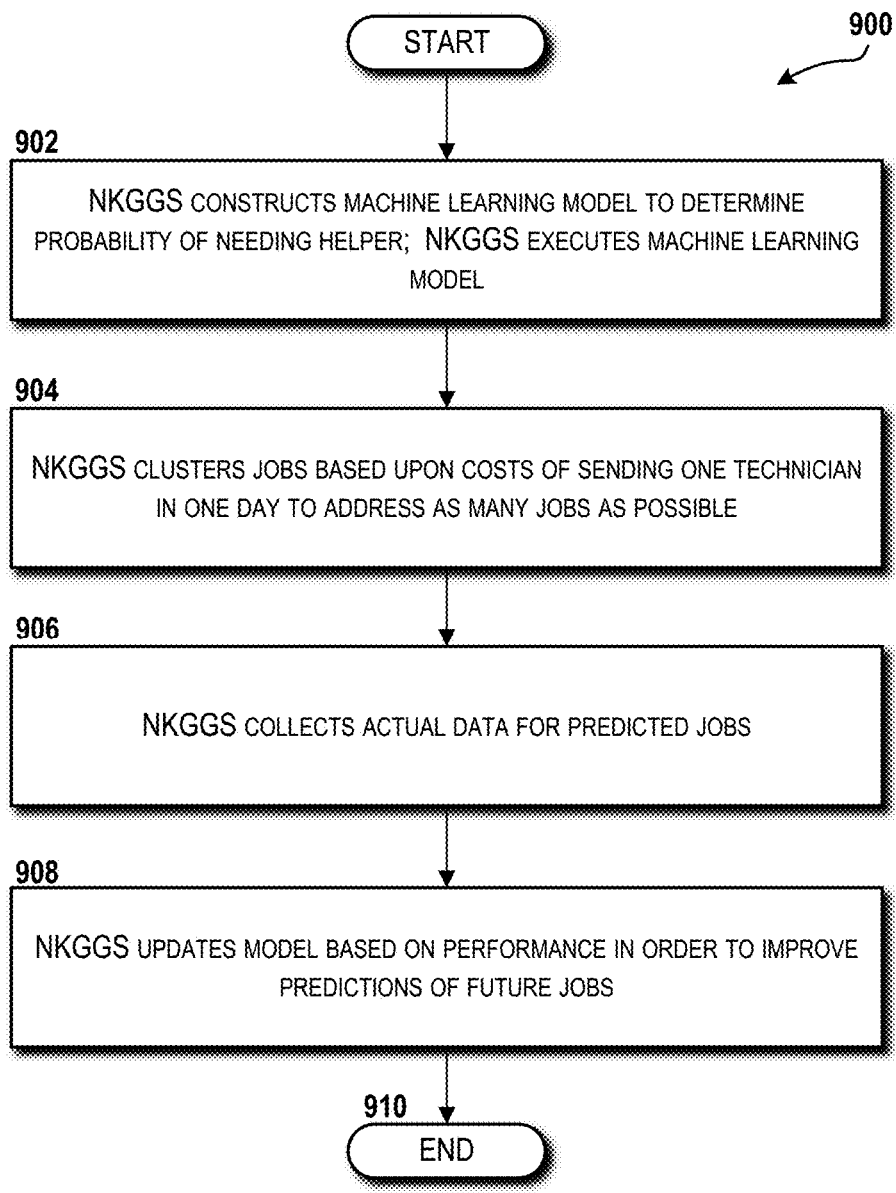
FIG. 9 is a flow diagram illustrating aspects of a method for optimizing dispatch tickets, according to an illustrative embodiment of the concepts and technologies disclosed herein.

Turning now to FIG. 9, a flow diagram illustrating aspects of a method 900 for optimizing dispatch tickets 132 will be described, according to an illustrative embodiment of the concepts and technologies disclosed herein. The method 900 begins and proceeds to operation 902. At operation 902, the NKGGS 140 constructs a machine learning model to determine the probability of needing a helper based on all (or at least a portion) of the elements from the network knowledge graph 142, such as helper rate, network data, bandwidth information, and the like, and a dependency score. The dependency score can be calculated based on network graph relationships, such as similar users, similar networks, similar profiles, and the like. Also, at operation 902, the NKGGS 140 executes the machine learning model to deterring the probability.

From operation 902, the method 900 proceeds to operation 904. At operation 904, the NKGGS 140 clusters jobs based upon costs of sending one technician in one day to address as many jobs as possible. The NKGGS 140 can be adjusted based upon costs of sending X technicians in Y days to address as many jobs as possible as the case may be. These clusters can be formed, in part, by calculating the Euclidian distance between latitude and longitude values.

From operation 904, the method 900 proceeds to operation 906. At operation 906, the NKGGS 140 collects actual data for predicted jobs. From operation 906, the method 900 proceeds to operation 908. At operation 908, the NKGGS 140 updates the model based on performance in order to improve predictions of future jobs.

From operation 908, the method 900 proceeds to operation 910. At operation 910, the method 900 can end.

Figure 10:
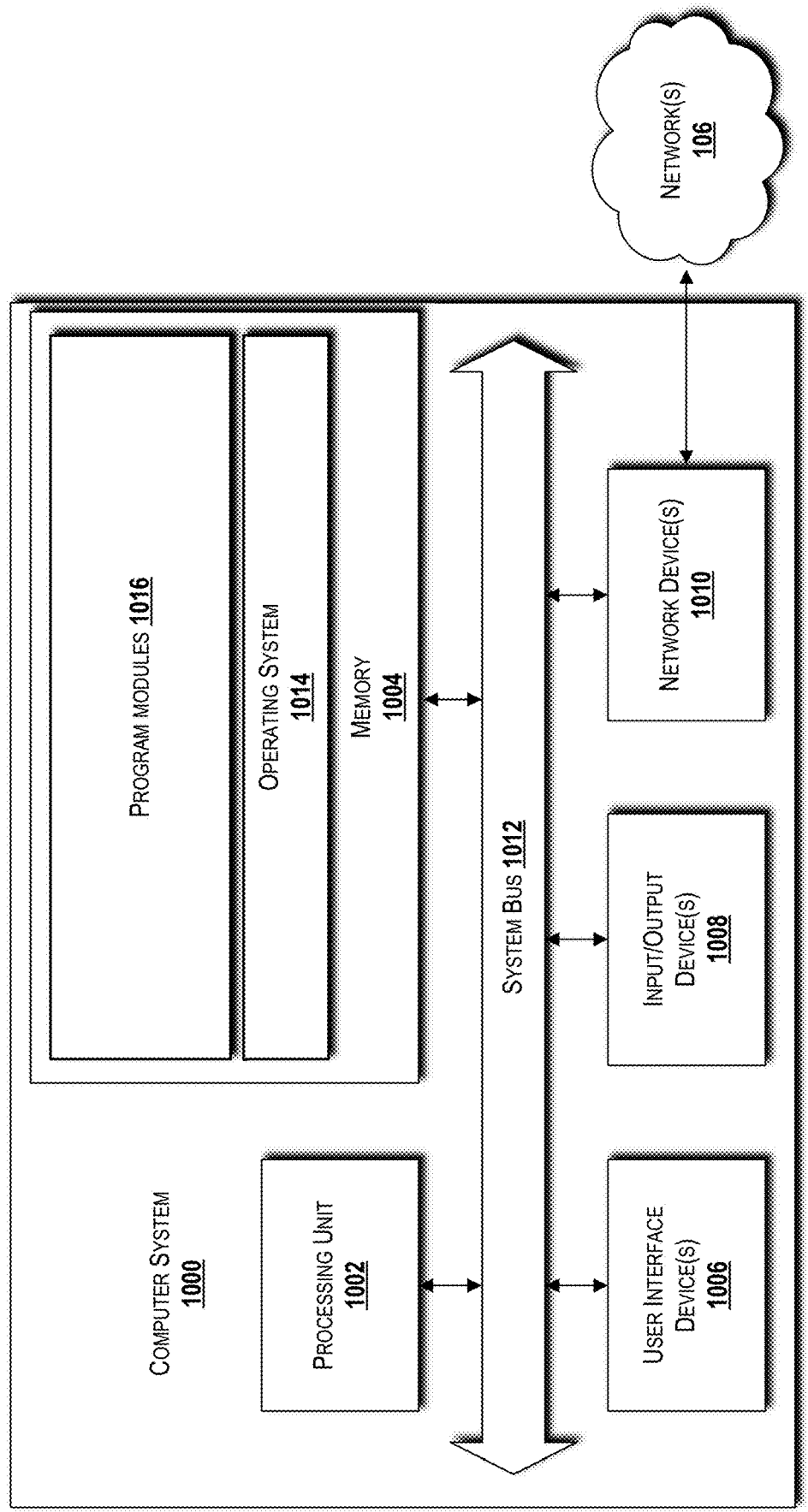
FIG. 10 is a block diagram illustrating an example computer system, according to some illustrative embodiments.

Turning now to FIG. 10, a block diagram illustrating a computer system 1000 configured to provide the functionality described herein in accordance with various embodiments of the concepts and technologies disclosed herein. In some embodiments, the OMS 112, the LFACS 120, the NMS 130, the FOD 134, the customer premises equipment 110 (e.g., end user equipment), the NKGGS 140, and/or other systems disclosed herein can be configured like and/or can have an architecture similar or identical to the computer system 1000 described herein with respect to FIG. 10. It should be understood, however, any of these systems, devices, or elements may or may not include the functionality described herein with reference to FIG. 10.

The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, or other type of processor known to those skilled in the art and suitable for controlling the operation of the computer system 1000.

The memory 1004 communicates with the processing unit 1002 via the system bus 1012. In some embodiments, the memory 1004 is operatively connected to a memory controller (not shown) that enables communication with the processing unit 1002 via the system bus 1012. The memory 1004 includes an operating system 1014 and one or more program modules 1016. The operating system 1014 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 1016 may include various software and/or program modules described herein. By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1000. In the claims, the phrase "computer storage medium," "computer-readable storage medium," and variations thereof does not include waves or signals per se and/or communication media.

The user interface devices 1006 may include one or more devices with which a user accesses the computer system 1000. The user interface devices 1006 may include, but are not limited to, computers, servers, personal digital assistants, cellular phones, or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer to output data.

The network devices 1010 enable the computer system 1000 to communicate with other networks or remote systems via one or more networks, such as the network 1310. Examples of the network devices 1010 include, but are not limited to, a modem, a RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network(s) may be a wired network such as, but not limited to, a WAN such as the Internet, a LAN, a wired PAN, or a wired MAN.

Figure 11:
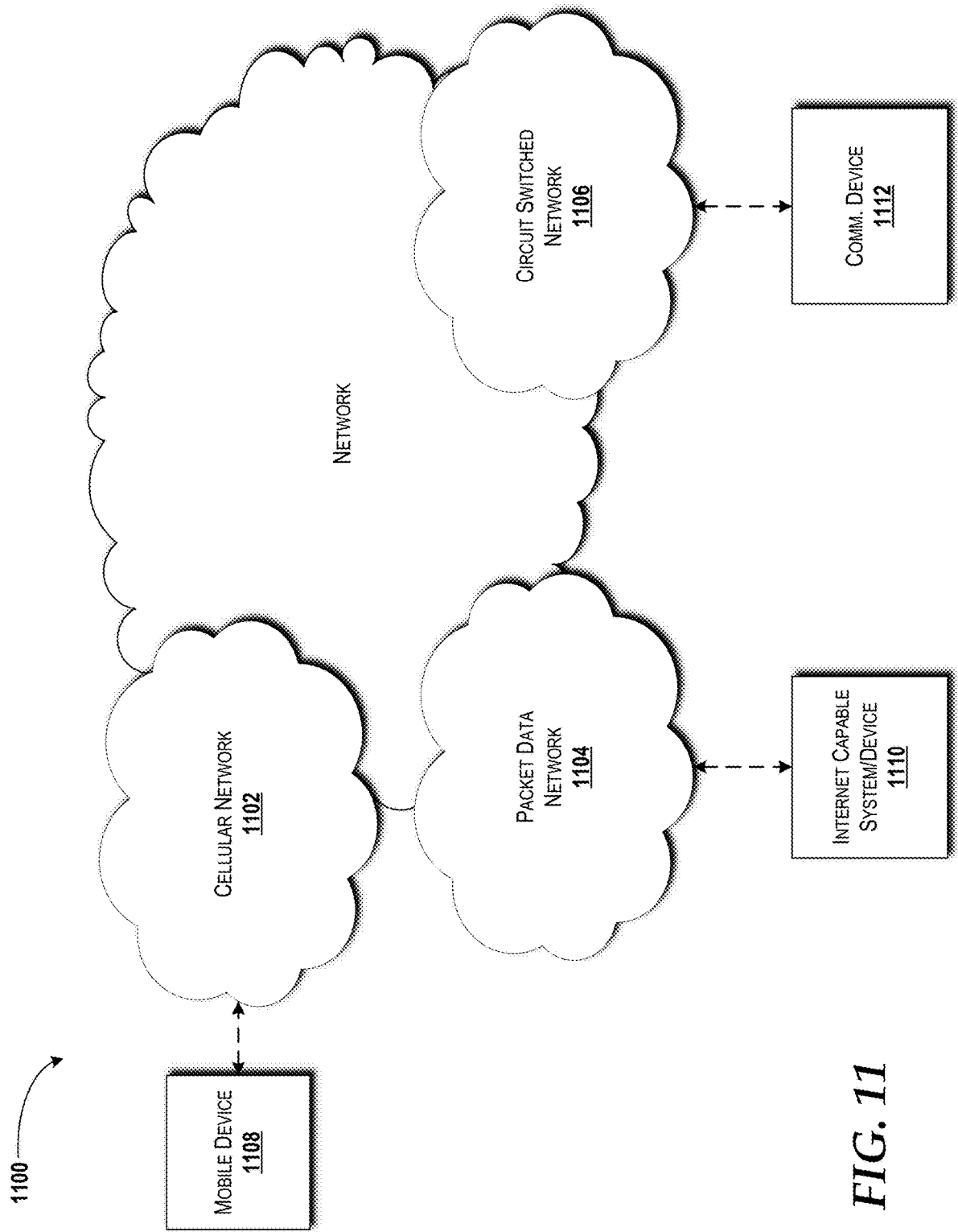
FIG. 11 schematically illustrates a network, according to an illustrative embodiment.

Turning now to FIG. 11, additional details of an embodiment of a telecommunications network 1100 are illustrated, according to an illustrative embodiment. In the illustrated embodiment, the telecommunications network 1100 includes a cellular network 1102, a packet data network 1104, for example, the Internet, and a circuit switched network 1106, for example, a publicly switched telephone network ("PSTN"). The network 106 illustrated and described above with reference to FIG. 1 can be or can include the packet data network 1104, the circuit switched network 1106, and/or one or more components thereof. The cellular network 1102 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1102 also includes radios and nodes for receiving and transmitting voice, data, and combinations thereof to and from radio transceivers, networks, the packet data network 1104, and the circuit switched network 1106.

A mobile communications device 1108, such as, for example, a cellular telephone, a user equipment, a mobile terminal, a PDA, a laptop computer, a handheld computer, and combinations thereof, can be operatively connected to the cellular network 1102. The cellular network 1102 can be configured as a 2G Global System for Mobile communications ("GSM") network and can provide data communications via General Packet Radio Service ("GPRS") and/or Enhanced Data rates for Global/GSM Evolution ("EDGE"). Additionally, or alternatively, the cellular network 1102 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced Uplink ("EDL") (also referred to as High-Speed Uplink Packet Access "HSUPA"), and HSPA+. The cellular network 1102 also is compatible with 4G mobile communications standards as well as evolved and future mobile standards.

The packet data network 1104 can include various devices, for example, the servers, computers, databases, and other devices in communication with another. The packet data network 1104 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1104 includes or is in communication with the Internet.

The circuit switched network 1106 includes various hardware and software for providing circuit switched communications. The circuit switched network 1106 may include, or may be, what is often referred to as a plain old telephone system ("POTS"). The functionality of a circuit switched network 1106 or other circuit-switched network are generally known and will not be described herein in detail.

The illustrated cellular network 1102 is shown in communication with the packet data network 1104 and a circuit switched network 1106, though it should be appreciated that this is not necessarily the case. One or more Internet-capable systems/devices 1110, for example, a personal computer ("PC"), a laptop, a portable device, or another suitable device, can communicate with one or more cellular networks 1102, and devices connected thereto, through the packet data network 1104. It also should be appreciated that the Internet-capable device 1110 can communicate with the packet data network 1104 through the circuit switched network 1106, the cellular network 102, and/or via other networks (not illustrated).

As illustrated, a communications device 1112, for example, the customer premises equipment 110, a telephone, facsimile machine, modem, computer, or the like, can be in communication with the circuit switched network 1106, and therethrough to the packet data network 1104 and/or the cellular network 1102. It should be appreciated that the communications device 1112 can be an Internet-capable device, and can be substantially similar to the Internet-capable device 1110. It should be appreciated that substantially all of the functionality described with reference to the network 106 can be performed by the cellular network 1102, the packet data network 1104, and/or the circuit switched network 1106, alone or in combination with additional and/or alternative networks, network elements, and the like.

Figure 12:
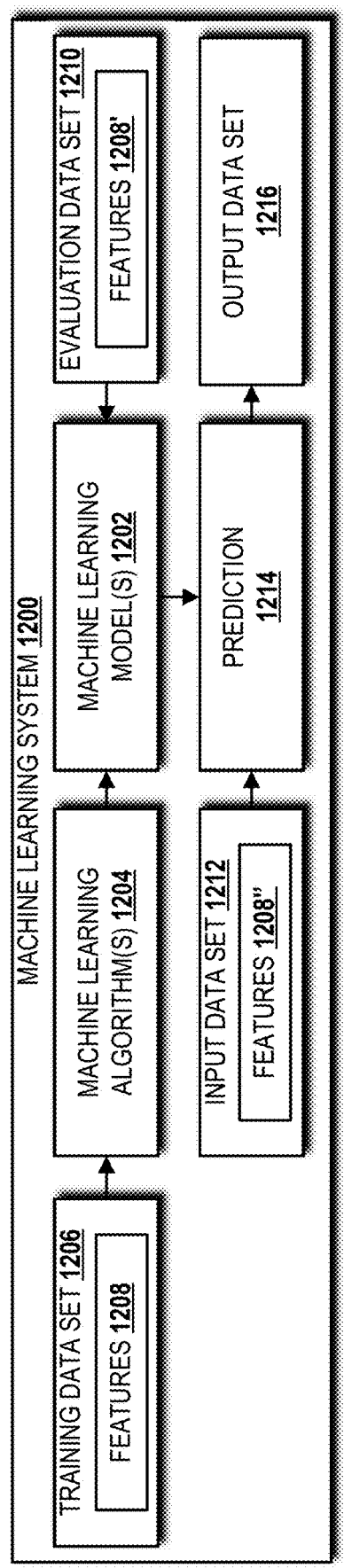
FIG. 12 is a block diagram illustrating a machine learning system capable of implementing aspects of the concept and technologies disclosed herein.

Turning now to FIG. 12, a machine learning system 1200 capable of implementing aspects of the embodiments disclosed herein will be described. In some embodiments, the NKGGS 140 can be or can include the machine learning system 1200. The illustrated machine learning system 1200 includes one or more machine learning models 1202. The machine learning models 1202 can include supervised and/or semi-supervised learning models. The machine learning model(s) 1202 can be created by the machine learning system 1200 based upon one or more machine learning algorithms 1204. The machine learning algorithm(s) 1204 can be any existing, well-known algorithm, any proprietary algorithms, or any future machine learning algorithm. Some example machine learning algorithms 1204 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 1204 based upon the problem(s) to be solved by machine learning via the machine learning system 1200.

The machine learning system 1200 can control the creation of the machine learning models 1202 via one or more training parameters. In some embodiments, the training parameters are selected modelers at the direction of an enterprise, for example. Alternatively, in some embodiments, the training parameters are automatically selected based upon data provided in one or more training data sets 1206. The training parameters can include, for example, a learning rate, a model size, a number of training passes, data shuffling, regularization, and/or other training parameters known to those skilled in the art. The training data in the training data sets 1206 can be collected from the NKGGS 140.

The learning rate is a training parameter defined by a constant value. The learning rate affects the speed at which the machine learning algorithm 1204 converges to the optimal weights. The machine learning algorithm 1204 can update the weights for every data example included in the training data set 1206. The size of an update is controlled by the learning rate. A learning rate that is too high might prevent the machine learning algorithm 1204 from converging to the optimal weights. A learning rate that is too low might result in the machine learning algorithm 1204 requiring multiple training passes to converge to the optimal weights.

The model size is regulated by the number of input features ("features") 1208 in the training data set 1206. A greater the number of features 1208 yields a greater number of possible patterns that can be determined from the training data set 1206. The model size should be selected to balance the resources (e.g., compute, memory, storage, etc.) needed for training and the predictive power of the resultant machine learning model 102.

The number of training passes indicates the number of training passes that the machine learning algorithm 1204 makes over the training data set 1206 during the training process. The number of training passes can be adjusted based, for example, on the size of the training data set 1206, with larger training data sets being exposed to fewer training passes in consideration of time and/or resource utilization. The effectiveness of the resultant machine learning model 1202 can be increased by multiple training passes.

Data shuffling is a training parameter designed to prevent the machine learning algorithm 1204 from reaching false optimal weights due to the order in which data contained in the training data set 1206 is processed. For example, data provided in rows and columns might be analyzed first row, second row, third row, etc., and thus an optimal weight might be obtained well before a full range of data has been considered. By data shuffling, the data contained in the training data set 1206 can be analyzed more thoroughly and mitigate bias in the resultant machine learning model 1202.

Regularization is a training parameter that helps to prevent the machine learning model 1202 from memorizing training data from the training data set 1206. In other words, the machine learning model 1202 fits the training data set 1206, but the predictive performance of the machine learning model 1202 is not acceptable. Regularization helps the machine learning system 1200 avoid this overfitting/memorization problem by adjusting extreme weight values of the features 1208. For example, a feature that has a small weight value relative to the weight values of the other features in the training data set 1206 can be adjusted to zero.

The machine learning system 1200 can determine model accuracy after training by using one or more evaluation data sets 1210 containing the same features 1208' as the features 1208 in the training data set 1206. This also prevents the machine learning model 1202 from simply memorizing the data contained in the training data set 1206. The number of evaluation passes made by the machine learning system 1200 can be regulated by a target model accuracy that, when reached, ends the evaluation process and the machine learning model 1202 is considered ready for deployment.

After deployment, the machine learning model 1202 can perform a prediction operation ("prediction") 1214 with an input data set 1212 having the same features 1208" as the features 1208 in the training data set 1206 and the features 1208' of the evaluation data set 1210. The results of the prediction 1214 are included in an output data set 1216 consisting of predicted data. The machine learning model 1202 can perform other operations, such as regression, classification, and others. As such, the example illustrated in FIG. 12 should not be construed as being limiting in any way.

Based on the foregoing, it should be appreciated that aspects of optimizing and reducing redundant dispatch tickets via network knowledge graph have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
    receiving a service order associated with an installation job for customer service in a telecommunication network;
    constructing, by a network knowledge graph generation system comprising a processor, a machine learning model to determine a probability of the installation job needing a helper job to fulfill the service order, wherein the constructing the machine learning model is responsive to the receiving the service order;
    creating, by the network knowledge graph generation system, a network knowledge graph, wherein the machine learning model determines the probability based, at least in part, upon the network knowledge graph and a dependency score;
    executing, by the network knowledge graph generation system, the machine learning model to determine the probability;
    clustering, by the network knowledge graph generation system, the installation job with a plurality of installation jobs;
    creating one or more dispatch tickets for the installation job and the plurality of installation jobs; and
    dispatching resources to complete the installation job and the plurality of installation jobs at a customer premises.

2. The method of claim 1, wherein creating, by the network knowledge graph generation system, the network knowledge graph comprises:
    creating an entity taxonomy for a plurality of entities, wherein each entity of the plurality of entities represents a node of the network knowledge graph;
    defining relationships among the plurality of entities; and
    creating the network knowledge graph using the plurality of entities and the relationships.

3. The method of claim 2, further comprising collecting network data from a plurality of heterogeneous sources.

4. The method of claim 3, wherein the plurality of heterogeneous sources comprise an order management system, a loop facility assignment and control system, a network management system, and a field operations database.

5. The method of claim 4, further comprising:
    embedding the network knowledge graph into a latent space; and
    searching the latent space.

6. The method of claim 1, further comprising:
    creating an entity taxonomy, the entity taxonomy including an identity of an entity and one or more attributes of each entity, wherein each entity represents a node of the network knowledge graph.

7. The method of claim 6, further comprising:
    identifying attributes of each entity; and assigning confidence scores to the attributes of each identity.

8. A network knowledge graph generation system comprising:
  a processor; and
  a memory comprising instructions that, when executed by the processor, cause the processor to perform operations comprising:
    constructing a machine learning model to determine a probability of an installation job needing a helper job to fulfill a service order, the service order being associated with a request for customer service in a telecommunication network,
    creating a network knowledge graph, wherein the machine learning model determines the probability based, at least in part, upon the network knowledge graph and a dependency score,
    executing the machine learning model to determine the probability,
    clustering the installation job with a plurality of installation jobs; and
    creating a dispatch ticket, the dispatch ticket operative to dispatch resources to complete the installation job and the plurality of installation jobs.

9. The network knowledge graph generation system of claim 8, wherein creating the network knowledge graph comprises:
  creating an entity taxonomy for a plurality of entities, wherein each entity of the plurality of entities represents a node of the network knowledge graph;
  defining relationships among the plurality of entities; and
  creating the network knowledge graph using the plurality of entities and the relationships.

10. The network knowledge graph generation system of claim 9, wherein the operations further comprise collecting network data from a plurality of heterogeneous sources.

11. The network knowledge graph generation system of claim 10, wherein the plurality of heterogeneous sources comprise an order management system, a loop facility assignment and control system, a network management system, and a field operations database.

12. The network knowledge graph generation system of claim 8, wherein the operations further comprise:
  embedding the network knowledge graph into a latent space; and
  searching the latent space.

13. The network knowledge graph generation system of claim 8,
  creating an entity taxonomy, the entity taxonomy including an identity of an entity and one or more attributes of each entity, wherein each entity represents a node of the network knowledge graph.

14. The network knowledge graph generation system of claim 13, further comprising:
  assigning confidence scores to the attributes of each identity.

15. A non-transitory, computer-readable medium comprising instructions that, when executed by a processor, cause the processor to perform operations comprising:
  creating a network knowledge graph;
  constructing a machine learning model to determine a probability of an installation job needing a helper job to fulfill a service order, wherein the service order is associated with the installation job to install or modify customer equipment in a telecommunications network;
  executing the machine learning model to determine the probability, wherein the machine learning model determines the probability based, at least in part, upon the network knowledge graph and a dependency score;
  clustering the installation job with a plurality of installation jobs; and
  dispatching a resources to complete the installation job and the plurality of installation jobs.

16. The non-transitory, computer-readable medium of claim 15, wherein creating the network knowledge graph comprises:
  creating an entity taxonomy for a plurality of entities, wherein each entity of the plurality of entities represents a node of the network knowledge graph;
  defining relationships among the plurality of entities; and
  creating the network knowledge graph using the plurality of entities and the relationships.

17. The non-transitory, computer-readable medium of claim 16, wherein the operations further comprise collecting network data from a plurality of heterogeneous sources comprising an order management system, a loop facility assignment and control system, a network management system, and a field operations database.

18. The non-transitory, computer readable medium of claim 15, wherein the operations further comprise:
  embedding the network knowledge graph into a latent space; and
  searching the latent space.

19. The non-transitory, computer readable medium of claim 15, wherein the operations further comprise:
  creating an entity taxonomy, the entity taxonomy including an identity of an entity and one or more attributes of each entity, wherein each entity represents a node of the network knowledge graph.

20. The non-transitory, computer readable medium of claim 19, wherein the operations further comprise:
  assigning a confidence score to attributes of each identity.

* * * * *